(12) United States Patent
Chirca et al.

(10) Patent No.: US 8,601,221 B2
(45) Date of Patent: Dec. 3, 2013

(54) SPECULATION-AWARE MEMORY CONTROLLER ARBITER

(75) Inventors: Kai Chirca, Richardson, TX (US);
Timothy D Anderson, Dallas, TX (US);
Joseph R M Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 72 days.

(21) Appl. No.: 13/218,414

(22) Filed: Aug. 25, 2011

(65) Prior Publication Data

US 2012/0072673 A1   Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 12/00* (2006.01)
*G06F 13/00* (2006.01)
*G06F 13/28* (2006.01)

(52) U.S. Cl.
USPC .......................................................... 711/151

(58) Field of Classification Search
USPC ........................................ 711/137, 147–151
See application file for complete search history.

(56) References Cited

U.S. PATENT DOCUMENTS

| | | | | |
|---|---|---|---|---|
| 5,499,355 A | * | 3/1996 | Krishnamohan et al. | 711/137 |
| 5,790,813 A | * | 8/1998 | Whittaker | 710/113 |
| 6,470,427 B1 | * | 10/2002 | Arimilli et al. | 711/137 |
| 7,039,747 B1 | * | 5/2006 | Mattur et al. | 710/310 |
| 7,143,242 B2 | * | 11/2006 | Hill et al. | 711/137 |
| 7,370,169 B2 | * | 5/2008 | Cheung | 711/167 |
| 2008/0235461 A1 | * | 9/2008 | Tan et al. | 711/146 |
| 2009/0049256 A1 | * | 2/2009 | Hughes et al. | 711/158 |
| 2009/0248992 A1 | * | 10/2009 | Sajayan et al. | 711/147 |
| 2012/0030431 A1 | * | 2/2012 | Anderson et al. | 711/137 |

* cited by examiner

*Primary Examiner* — Matthew Bradley
*Assistant Examiner* — Rocio Del Mar Perez-Velez
(74) *Attorney, Agent, or Firm* — Robert D. Marshall, Jr.; Wade James Brady, III; Frederick J. Telecky, Jr.

(57) ABSTRACT

A memory arbiter minimizes latency of memory accesses in a system having multiple processors. The memory arbiter improves overall system performance by managing the memory requests from each processor individually before those requests are sent to a central memory arbiter for handling memory requests for the shared resources from the multiple processors. The local memory arbiter buffers the memory requests from a local processor, analyzes the buffered memory requests, and optimizes the requests by reordering commands according to a rule set, and by performing write merging and prefetch squashing in certain conditions.

7 Claims, 3 Drawing Sheets

US 8,601,221 B2

SPECULATION-AWARE MEMORY CONTROLLER ARBITER

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to access data during execution. The processors more efficiently execute instructions when, for example, data accessed by a processor is stored locally in a cache. The problem is compounded when multiple caches (often having differing line sizes and timing requirements) of multiple processors are used together in a multiprocessor system. Processor stalls often occur, for example, when different processors attempt to access the same memory resources. Thus, an improvement in techniques for reducing stalls that are associated with processors sharing memory resources is desirable.

The problems noted above are solved in large part by a local memory arbiter that minimizes latency of memory accesses in a system having multiple processors. The disclosed memory arbiter improves overall system performance by managing the memory requests from each processor individually before those requests are sent to a central memory arbiter for handling memory requests for the shared resources from the multiple processors. The local memory arbiter buffers the memory requests from a local processor, analyzes the buffered memory requests, and optimizes the requests by reordering commands according to a rule set, and by performing write merging and prefetch squashing in certain conditions.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
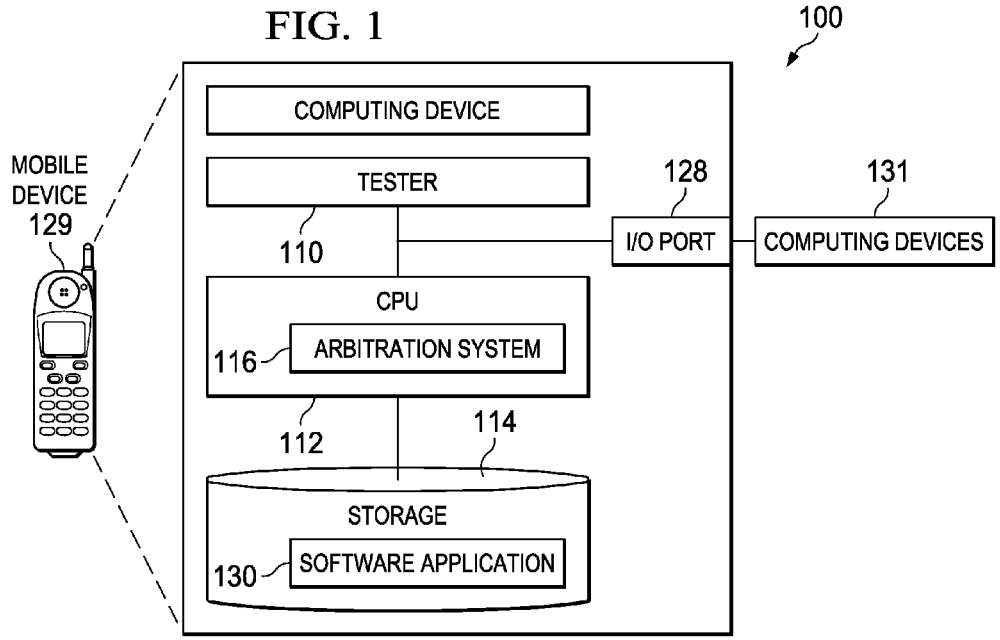
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more arbitration systems 116, which are used to arbitrate certain memory operations during the execution of the software application 130.

Arbitration systems 116 track memory commands from one or more streams using "slots" to maintain pointers to memory addresses used to prefetch data for each stream. In a multi-core shared memory system, the requests are generated by there are multiple cores competing for the same memory resources. However, not all requests from a given core have the same criticality in terms of time of completion. For example, write requests from a processor typically will not stall the processor if the write requests are not serviced right away, while cache read miss requests will usually stall the CPU if the cache read miss requests are not serviced right away. Additionally, prefetch requests for instruction cache may be determined to be not needed (e.g., "flushed") if there is an upcoming branch in the program stream.

Disclosed herein are techniques for reducing hardware latency associated with memory accesses. The disclosed techniques reduce hardware latency by arranging a memory arbiter for performing local arbitration before sending requests to a central arbiter for performing arbitration from multiple processors. For example, a command reordering buffer of a memory arbiter reorders commands (such as demand reads, demand writes, data prefetching, and program prefetching) to lessen the latency of memory access of commands that are more likely to have a higher priority.

Figure 2:
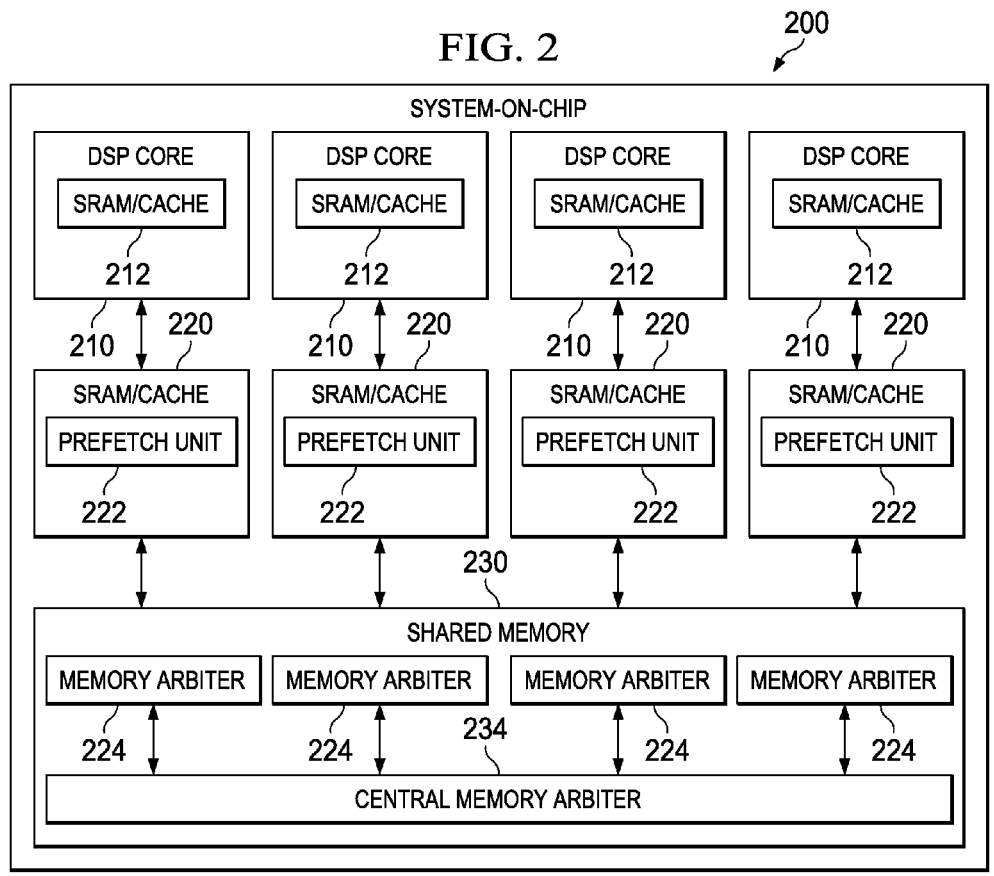
FIG. 2 is a block diagram illustrating a computing system including a (local) memory arbiter in accordance with embodiments of the disclosure.

FIG. 2 is a block diagram illustrating a computing system including a (local) memory arbiter in accordance with embodiments of the disclosure. Computing device 100 is illustrated as an SoC 200 that includes one or more DSP cores 210, SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a level-one data cache such as SRAM/Cache 212. Each DSP core 210 optionally is connected to a level-two cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

In various embodiments, each DSP core 210 has an associated local memory arbiter 224 for reordering memory commands in accordance with a set of reordering rules. Thus, memory requests from differing streams from different processors are each arbitrated at a local level before sending the memory requests to a central memory arbiter 234. The central memory arbiter 234 is arranged to control memory accesses for shared memory that are generated by differing "cores" (e.g., processors) that do not share a common memory arbiter 224.

Figure 3:
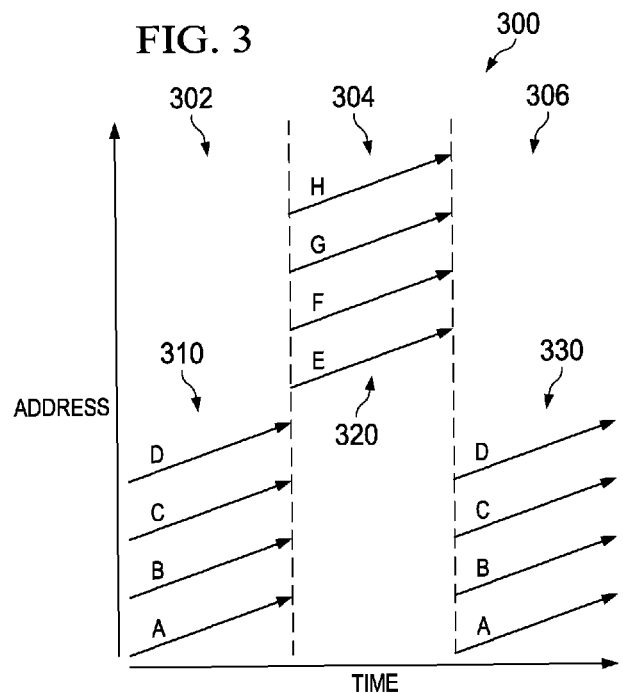
FIG. 3 is a timing diagram illustrating multi-stream memory accesses over time.

FIG. 3 is a timing diagram illustrating multi-stream memory accesses over time. Plot 300 vertically represents increasing memory addresses and horizontally represents memory accesses of data over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++) \{d[i]=a[i]+b[i]+c[i]\} \quad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

Figure 4:
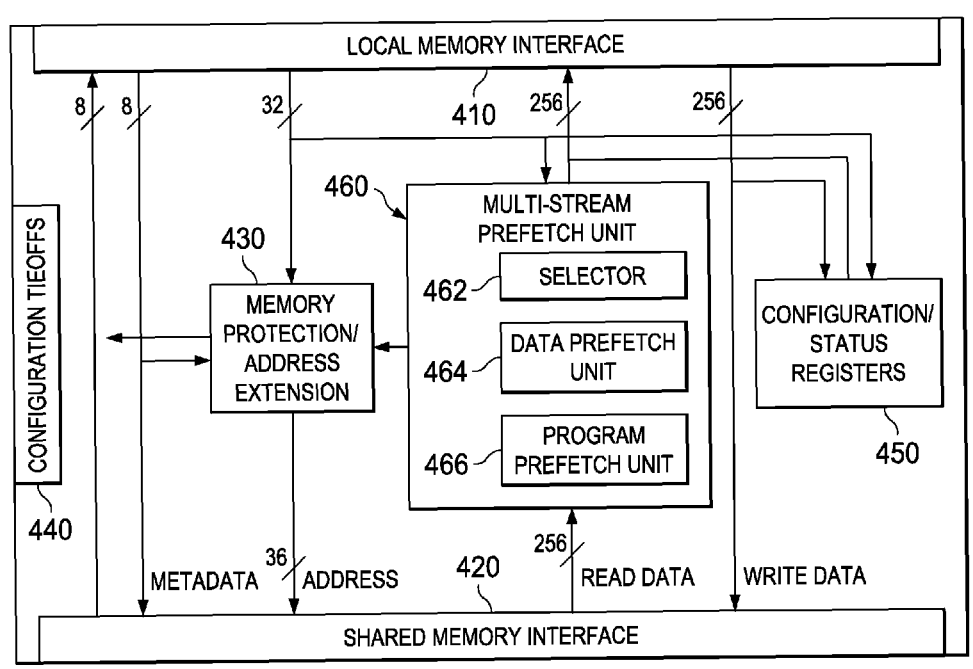
FIG. 4 is a block diagram illustrating a memory controller that includes a multi-stream prefetch unit in accordance with embodiments of the present disclosure.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction (e.g., program data) fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, request for access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 includes a selector 462 that chooses a prefetch unit based upon the type of memory request that is received. When, for example, a request from a level-one data cache is received, the selector 462 enables data prefetch unit 464 to handle potential prefetches for the received data memory request. Likewise, when a request from a level-one program cache is received, the selector 462 enables program prefetch unit 466 to handle potential prefetches for the received program memory request.

Figure 5:
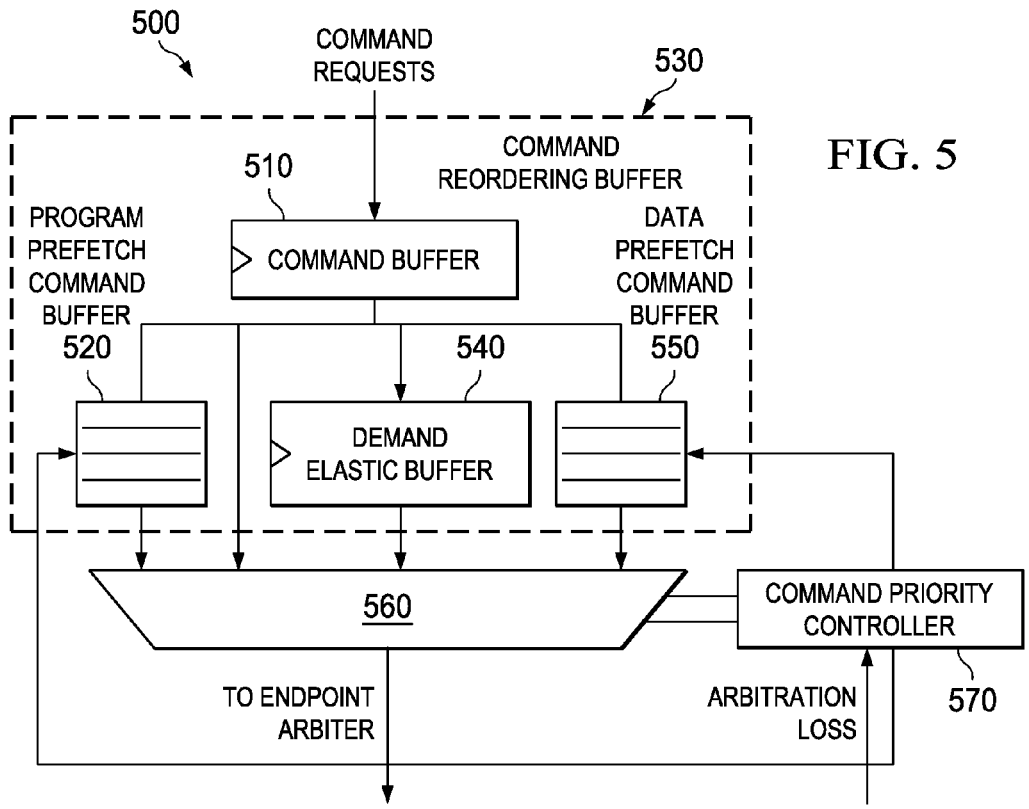
FIG. 5 is a block diagram illustrating a local memory arbiter in accordance with embodiments of the present disclosure.

FIG. 5 is a block diagram illustrating a local memory arbiter 500 in accordance with embodiments of the present disclosure. Local memory arbiter 500 corresponds to local memory arbiter 224 illustrated in FIG. 2 and is arranged to receive a command from an "upstream" (e.g., higher-level hierarchical) memory controller such as (local) memory controller 400. Command buffer 510 is arranged to latch a received memory request command and associated data. The latched command and data are selected for output to a central arbiter (e.g., central memory arbiter 234) when the latched command has sufficient priority. When the latched command does not have sufficient priority during a portion of the memory cycle at which the command is latched, the command latched in the command buffer 510 is stored in one of the storage queues.

The type of the command is used to determine in which storage queue the command is to be saved. The separate demand, program and data prefetch command buffers allow incoming request to be reordered without delaying the incoming traffic of memory requests. For example, the storage queues include the program prefetch command buffer 520, the data prefetch command buffer 540, or demand elastic buffer 550.

The storage queues (including command buffer 510) are used to form a command reordering buffer 530 that stores up to a total of ten commands (two demand read or write requests and eight prefetch requests, four of which are for program prefetch commands, and four of which are for data prefetch commands). The command priority controller 570 uses a set of reordering rules to allow reordering of the requests stored in the above buffers in the local memory arbiter 224 by control of the selection made by multiplexer 560. Demand reads have the highest priority, prefetch reads have the next highest priority, while writes typically have the lowest priority. Reordering of writes is disabled when read requests and write requests have an overlapped address range (e.g. when a read command depends on the results of a write command). Reordering read/write commands (when there is not forced ordering required by the user) reduces the processor stall cycles on cache read misses.

The command priority controller 570 also uses write merging to better utilize the bandwidth to the shared memory resources when writes are pending for central arbitration. For example, if a partial write to an SRAM location is still pending arbitration in the local memory arbiter 500, and a subsequent write command is received that implicates the same line address as the partial write (which would normally be different bytes of the same cache line), then the local memory arbiter 500 merges the two writes into a single request that is presented to the central memory arbiter 234.

The local memory arbiter 500 also asserts priority escalation for the amount of time a high priority command is propagated into and through the local memory arbiter 500 as well as into and through the central memory arbiter 234. In contrast, conventional systems generally elevate the priority of all the commands that have been received before the high priority command is received from a given local memory arbiter 500.

Propagation of commands through the local memory arbiter 500 depends on whether the commands to be propagated are demand requests or prefetch requests. For demand requests, the command reorder buffer 530 can store up to two non-speculative (demand request) commands—one in the command pipeline register and another in the demand elastic buffer. Further demand requests are stalled when two demand requests remain pending in the command reorder buffer 530 when the further demand requests are received. The demand elastic buffer 540 is used to store a demand request when the demand request in the command pipe register 510 is presented to the central memory arbiter 234 and the stored demand request fails to win arbitration with the central memory arbiter 234. (The stored demand request is latched in the demand elastic buffer 540 when the demand elastic buffer 540 is empty: if the demand elastic buffer 540 if full, further demand requests are stalled as explained above.)

For prefetch requests, the command reorder buffer 530 can store up to four 32-byte prefetch requests (such as program prefetches due to a level-one program cache miss) in program prefetch command buffer 520 and up to four 64-byte prefetch requests (data prefetches due to an level-one data cache miss or prefetches due to a level-two unified cache miss) in data prefetch command buffer 550. The program prefetch command buffer 520 and the data prefetch command buffer 550 are each are arranged as FIFO (First In First Out) buffers wherein the oldest entry is overwritten when the respective FIFO is full.

Commands addressing the shared memory (e.g., shared memory 230) or external memory are reordered by the command reorder buffer 530 to improve performance in accordance with the following set of rules. Firstly, demand reads are selected ahead of prefetch reads of any size. Secondly, demand read requests are selected ahead of independent write requests (as long as there is no addressed range overlap between the read and the write commands). Next, prefetch reads are selected ahead of independent write requests (as long as there is no addressed range overlap between the prefetch read and the write command) with a lower priority such that 64-byte prefetch reads are selected ahead of write requests and 32-byte prefetch requests, while 32-byte prefetch requests are selected ahead of write requests.

The prefetch commands stored in command reorder buffer 530 can be cancelled in accordance with a set of prefetch cancelling rules used to discard prefetch requests that have been determined to be unneeded or undesired. The command reorder buffer supports a prefetch "squashing" (e.g., cancelling) mechanism wherein one or more buffered prefetch requests are terminated. The prefetch requests are squashed (e.g., by returning bus read timeout errors returned in response to a read status request) when one of the below-discussed conditions is encountered (in order of precedence). Prefetch squashing reduces redundant traffic downstream by not allowing out of date prefetch requests to be presented for endpoint arbitration (by a central memory arbiter, for example).

Firstly, a prefetch request is cancelled when the prefetch request arrives when a write request is received that has an address range that overlaps an address range of a read request. Cancelling the overlapping request maintains a write-before-read dependency, while still allowing read requests to have priority over write requests.

Secondly, all buffered 32-byte prefetch requests are cancelled when a demand program read request of any size arrives. All buffered 32-byte prefetch requests are cancelled (flushed) on arrival of the demand program fetch because the buffered 32-byte prefetch requests are now considered to be out-of-date. The buffered 32-byte prefetch requests are considered to be out-of-date because the demand program fetch is indicative that a program branch has been taken, and the currently buffered prefetch requests are thus along the "not-taken" path of the processor.

Next, the oldest individual command request pending in a prefetch command buffer of either the program-prefetch type or the data-prefetch type is cancelled when the prefetch command buffer is full. For example, when four 32-byte prefetch command requests are buffered in the program prefetch command 520 and have not been granted arbitration by the local memory arbiter 224, a new 32-byte prefetch request replaces the oldest 32-byte prefetch request pending in the program prefetch command buffer 520. Similarly, a 64-byte data prefetch request received when the data prefetch command buffer 550 is full would squash the oldest outstanding 64-byte prefetch request in the data prefetch command buffer 550.

The local memory arbiter 500 returns notifications of the squashed prefetch commands to an upstream memory controller. For example, the squashed prefetch commands can be reported by returning a read status with the timeout error. However, such notifications might conflict with read returns (and other notifications) from other endpoints (such as main memory 230 or the central memory arbiter 234) that are being returned to the read return interface to the upstream memory controller. The notifications of the local memory arbiter 500 for the prefetch cancellations are given a lower bus access priority so the notifications of the local memory arbiter 224 would wait for other read status returns to finish, and are thus stored until the prefetch command bus is available. The prefetch squashing logic is typically not required to send the notifications of the timeout statuses back in any specific order.

The local memory arbiter 500 uses write merging logic (in the command priority controller 570, for example) to better maximize the write bandwidth to the main memory 230 by using write merging. For example, adjacent 32-byte write requests can be merged into a smaller number of write requests while the write commands are pending arbitration at a downstream memory arbiter such as the central memory arbiter 234. Write merging reduces processor stalls that may be caused by serial, non-cacheable writes having overlapping address windows. The write merging is ideally accomplished without stopping the write stream nor affecting other unmerged writes from cores (or processors) writing to main memory 230.

For better performance for communications for each of the endpoint slaves and evenly provide accesses from all masters, the local memory arbiter 500 monitors the access size of each command closely when performing write merging. For external memory, the local memory arbiter 500 splits larger commands into multiple subcommands in accordance with an optimum access size of 64 bytes. Each of the merged write accesses is no larger than 64 bytes, and is also aligned to a 64-byte boundary. For on-chip shared memory, the physical width of the RAM (random access memory) access port determines the optimum command size, which is 32 bytes in an embodiment. Accordingly, the local memory arbiter 500 adjusts the subcommand (e.g., write-merged commands) sizes according to operating parameters of the endpoint slaves.

Figure 6:
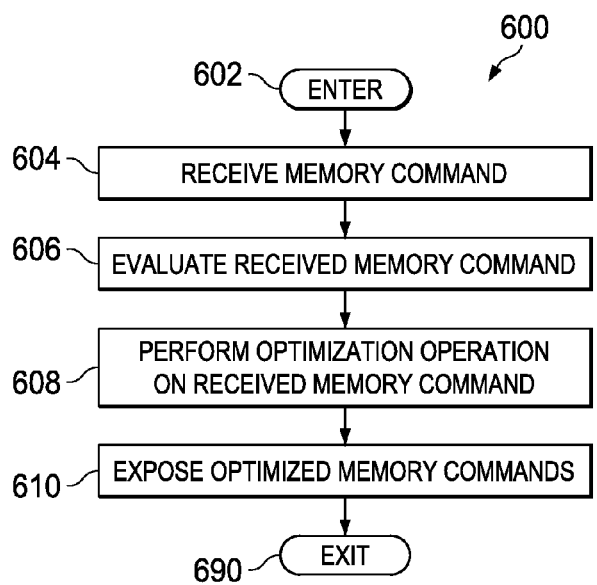
FIG. 6 is a process diagram illustrating optimization of local memory commands in accordance with embodiments of the present disclosure.

FIG. 6 is a process diagram illustrating optimization of local memory commands in accordance with embodiments of the present disclosure. Process 600 is entered at node 602 and proceeds to function 604. At function 604, a memory command is received that includes an associated address for retrieving from memory, wherein the memory command is received from a requestor that is a processor or a cache that is local to the processor.

At function 606, the type of memory command is determined. Each memory command is evaluated to determine if the received memory command is a memory read command, a memory write command, or a prefetch command. The evaluated memory commands are stored locally in a local memory arbiter having buffers. When the prefetch command is evaluated as being a program prefetch command, the prefetch command is entered into a program prefetch buffer. When the prefetch command is evaluated as being a data prefetch command, the prefetch command is entered into a data prefetch buffer. In an embodiment, the program prefetch buffer stores prefetch commands each having a 32-byte word size and the data prefetch buffer stores prefetch commands each having a 64-byte word size.

In function 608, an optimization operation is performed upon one or more of the received memory commands in response to the evaluation of each memory command. The optimized memory commands are ordered with memory read commands having a higher priority than memory write commands, and memory write commands having a higher priority than prefetch commands. To help maintain cache coherency, a memory write command has a higher priority than a memory read command when addresses associated with the memory write command and the memory read command overlap or are the same. The optimization operation can also include an optimizing an optimized memory write command that is formed from two memory write commands having addresses that occur in a same cache line.

In function 610, the optimized memory commands are exposed to the central memory arbiter by selecting a current highest priority buffered memory command using a multiplexor having an input from a program prefetch buffer, a second input from a data prefetch buffer, and one or more inputs from buffered memory read or write commands. When the central memory arbiter does not accept an exposed optimized memory command (for example, due to a higher priority memory command from another local memory arbiter), the central memory arbiter asserts an "Arbitration Loss" signal that is received by the local memory arbiter.

After the exposed data is read-out from the local memory arbiter, the process flow continues to node 690, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for optimizing memory commands in multiprocessor systems, comprising:
    receiving memory commands from a requestor that is a processor or a cache that is local to the processor;
    evaluating each memory command to determine if the received memory command is a program memory read command, a data memory read command, a memory write command, a program prefetch command, or a data prefetch command, wherein the evaluated memory commands are stored locally;
    separately buffering received prefetch program commands and received prefetch data commands;
    performing an optimization operation upon one or more of the received memory commands in response to the evaluation of each memory command; and
    exposing the optimized memory commands to a central memory arbiter that is arranged to receive the optimized memory commands and memory commands from other requestors by selecting a current highest priority buffered command;
    wherein said optimization operation includes flushing all buffered program prefetch commands upon receiving a program memory read command.

2. The method of claim 1, wherein:
    said step of separately buffering stores program prefetch commands having a 32-byte word size and stores data prefetch commands having a 64-byte word size.

3. The method of claim 1, wherein:
said optimization operation includes discarding a data prefetch command having an overlapping address with an already buffered memory write command.

4. A digital system, comprising:
a shared memory system for storing and retrieving data;
a central memory arbiter that is arranged to arbitrate memory commands from a plurality of processors for accessing the shared memory system; and
a local memory arbiter that is arranged to receive memory commands from a requestor that is one of the plurality of the processors or is a cache that is local to one of the plurality of the processors, that is arranged to evaluate each received memory command to determine if the received memory command is a program memory read command, a data memory read command, a memory write command, a program prefetch command, or a data prefetch command, that is arranged to perform an optimization operation upon one or more of the received memory commands in response to the evaluation of each memory command, wherein optimized memory commands are stored in one or more buffers of the local memory arbiter, and that is arranged to expose the optimized memory commands to the central memory arbiter and wherein said optimization operation includes flushing all buffered program prefetch commands upon receiving a program memory read command.

5. The system of claim 4, wherein:
said local memory arbiter wherein said optimization operation includes discarding a data prefetch command that has an overlapping address with an already buffered memory write command.

6. A local memory arbiter for optimizing memory commands, comprising:
a memory interface that is arranged to receive from a memory commands each having an associated address, wherein the associated address points to data stored in a lower-level hierarchical memory;
a command buffer that is arranged to latch a received memory command;
a program prefetch buffer that is arranged to buffer the received memory command when the received memory command is a program prefetch command;
a data prefetch buffer that is arranged to buffer the received memory command when the received memory command is a data prefetch command; and
a command priority controller that is arranged to evaluate and select the contents of the command buffer, the program prefetch buffer, or the data prefetch buffer, wherein the contents are selected in accordance with a priority wherein memory read commands have a higher priority than memory write commands, and memory write commands have a higher priority than prefetch commands, and wherein a memory write command has a higher priority than a memory read command when addresses associated with the memory write command and the memory read command overlap or are the same, and wherein the selected contents are exposed to a central memory arbiter that that is arranged to arbitrate memory commands from a plurality of processors for accessing the shared memory system, said command priority controller operable to flush all buffered program prefetch commands upon receiving a program memory read command.

7. The local memory arbiter of claim 6, wherein:
said command priority controller is further operable to discard a data prefetch command having an overlapping address with an already buffered memory write command.

* * * * *